(12) United States Patent
Miller et al.

(10) Patent No.: US 6,902,593 B2
(45) Date of Patent: Jun. 7, 2005

(54) SEPARATION DEVICE TO REMOVE FINE PARTICLES

(75) Inventors: Richard B. Miller, Katy, TX (US); Eusebius Gbordzoe, Houston, TX (US); Yong-Lin Yang, Katy, TX (US); Suisheng M. Dou, Baton Rouge, LA (US); David Lee Johnson, Clifton, VA (US)

(73) Assignee: Kellogg Brown and Root, Inc., Houston, TX (US)

( * ) Notice: Subject to any disclaimer, the term of this patent is extended or adjusted under 35 U.S.C. 154(b) by 281 days.

(21) Appl. No.: 10/248,875

(22) Filed: Feb. 26, 2003

(65) Prior Publication Data

US 2004/0166033 A1 Aug. 26, 2004

(51) Int. Cl.[7] .............................................. B01D 45/12
(52) U.S. Cl. .............................. 55/338; 55/347; 55/348; 55/349; 55/426; 55/457; 55/459.1; 422/147
(58) Field of Search ........................... 55/338, 347, 348, 55/349, 424, 426, 457, 459.1; 422/147

(56) References Cited

U.S. PATENT DOCUMENTS 3,137,133 A * 6/1964 Wilson et al. ................ 60/781
3,631,657 A * 1/1972 Wilson ......................... 55/348
5,372,707 A   12/1994 Buchanan et al. .......... 208/161
5,464,528 A   11/1995 Owen et al. ................ 208/161
5,643,537 A    7/1997 Raterman et al. .......... 422/147
5,681,450 A   10/1997 Chitnis et al. .............. 208/113
5,690,709 A   11/1997 Barnes ......................... 55/348
5,779,746 A    7/1998 Buchanan et al. ............ 55/452

* cited by examiner

Primary Examiner—Robert A. Hopkins
(74) Attorney, Agent, or Firm—Kellogg Brown and Root, Inc.

(57) ABSTRACT

A multi-cyclone gas/solids separator with reduced solids re-entrainment is disclosed. The separator uses a plurality of cyclones spaced horizontally apart from adjacent cyclones to process flue gas containing residual catalyst fines. Each cyclone has a body that has a feed inlet end for admitting gas and entrained solids into an annular space defined by a sidewall of the cyclone body and a cylindrical gas outlet tube axially aligned with the cyclone body. A solids outlet at an opposing end of the cyclone body has a tangential outlet for solids and a minor amount of gas through a sidewall of the cyclone body. A gas reflux opening is axially aligned with the outlet tube. The plurality of cyclones share both a common catch chamber for solids discharged from the solids outlet, and a common manifold for gas and entrained solids. A plurality of shields are positioned in the catch chamber to inhibit discharge of solids from the tangential outlet of the adjacent cyclones into a vicinity of an inlet of the gas reflux opening.

36 Claims, 6 Drawing Sheets

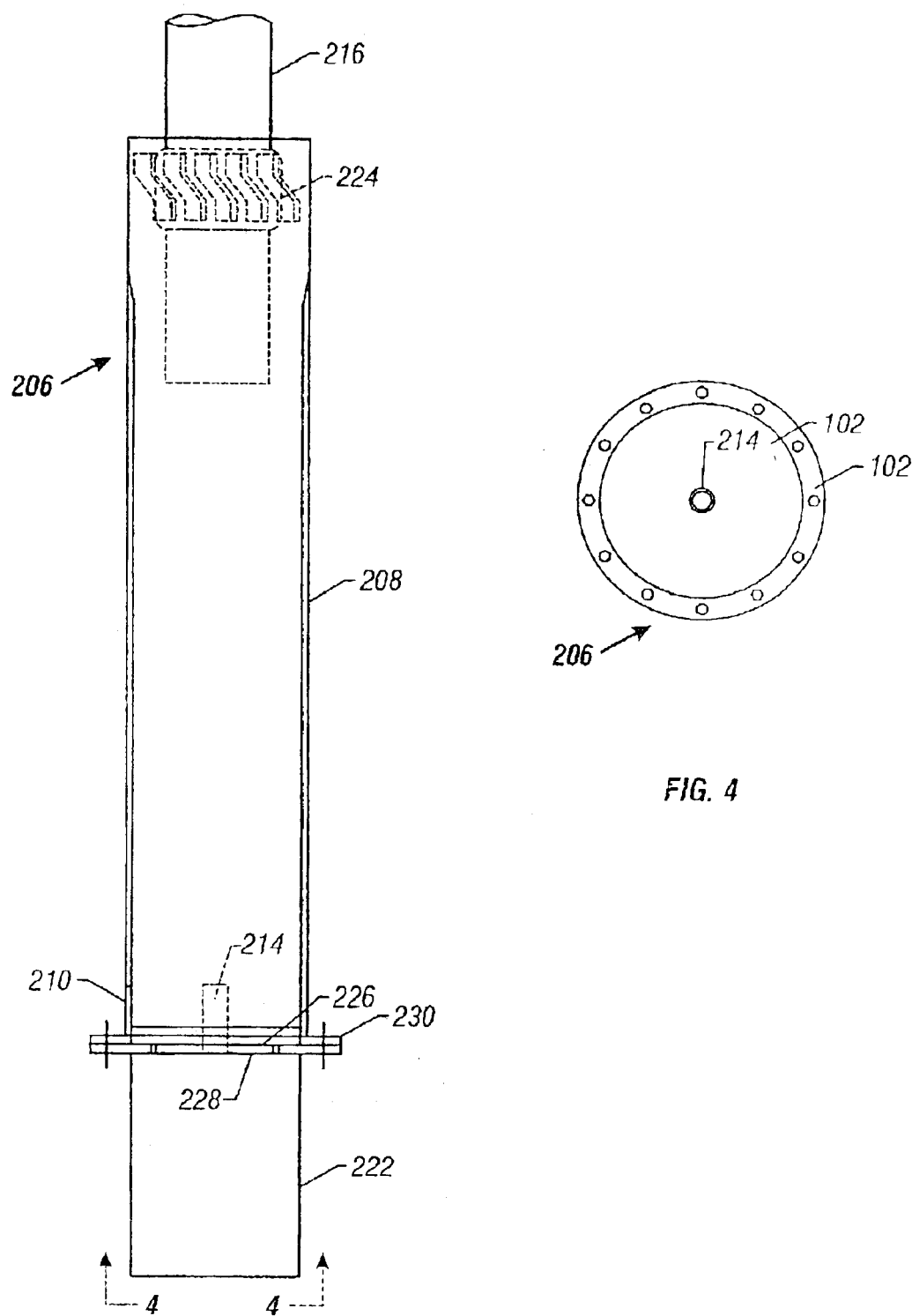

SEPARATION DEVICE TO REMOVE FINE PARTICLES

BACKGROUND OF INVENTION

This invention pertains to cyclone separators, equipped with a plurality of closed-bottom cyclones each having solids discharge means and gas reflux means, used to recover catalyst fines in the fluidized catalytic cracking of heavy hydrocarbon feeds. More particularly, the invention relates to the discovery and inhibition of cross talk between the solids discharge means and the gas reflux means.

Cyclone separation is used to separate particles from gas. A particulate-laden gas stream is introduced into a cylindrical chamber. A spin is imposed on the gas, either by tangential addition or axial addition coupled with swirl vanes. Solids are thrown to the wall of the chamber by inertia, while a cleaner gas is withdrawn from a central region of the cyclone. Some gas exits with the solids. Solids may be discharged via a tangential outlet through a sidewall of the cyclone, or axially discharged.

There are many types of cyclone separators, but they can be arbitrarily classified as open-bottom or closed-bottom. The present invention is especially useful for improving the operation of closed-bottom cyclones. Closed-bottom cyclones have a generally cylindrical body which is essentially closed save for one or more feed inlets, having usually only one gas outlet and a solids outlet. Closed-bottom cyclones are effectively isolated from the atmosphere of a vessel containing the cyclone. Closed-bottom cyclones usually run at a slightly higher or slightly lower pressure than the atmosphere in the vessel around the cyclone. If pressure in the cyclone body is higher than the pressure outside the cyclone, then the cyclone is a positive pressure cyclone. If pressure in the cyclone body is lower than the pressure outside the cyclone then the cyclone is a negative pressure cyclone.

In a closed-bottom cyclone the feed gas is generally added tangentially to an end portion of the cyclone body. The gas outlet is usually a tube, axially aligned with the longitudinal axis of the cyclone body, passing through the same end of the cyclone receiving feed gas. The solids are usually withdrawn via an elongated dipleg at an end of the cyclone body opposing the gas outlet. In a third stage separator (TSS), discussed below, the solids are sometimes withdrawn via a horizontal slit or slot in the wall of the cyclone body, and usually at an end opposite from the gas outlet.

Somewhat related to the distinction between open- and closed-bottom cyclones is whether or not the cyclone dust outlet shares the same space (or vessel volume) as the gas inlet or is isolated. When cyclones receive feed gas from, and discharge into, a fluid bed like the fluid catalytic cracking (FCC) regenerator, gas discharged with solids through the diplegs recirculates up from the fluid bed to the cyclone inlet that is in the same space. Gas recycle from solids outlet to gas feed inlet occurs because the solids outlet and gas feed inlet share the same vapor volume in the reactor. When the feed gas inlet is fluidly isolated from the solids outlet, this type of gas recycle does not take place. When solids discharge into a closed vessel such as the bottom of a TSS, gas discharged with solids through the dust outlet of the cyclone cannot return to the cyclone inlet. It was always assumed that because the dust catcher was essentially sealed that no more gas would escape via the solids outlet than would be removed with the solids phase removed from the dust catcher, until the innovation to use a gas reflux in the outlet end of the cyclone as described in U.S. Pat. No. 5,681,450 to Chitnis et al., which is hereby incorporated in its entirety for all purposes by reference herein.

Briefly, the problem solved by the Chitnis et al. patent can be mentioned now as follows. In some types of cyclones, and in some cyclone placements, vapor recycle from the solids outlet to the feed gas inlet is not a significant problem. In open-bottom cyclones, pressures are essentially in balance inside and outside the cyclone. Some gas always leaves with or is entrained or aspirated with departing solids flow. Such gas, beyond that which is eventually removed with the separated solids, easily returns into the open body of the cyclone. In closed- or open-bottom cyclones where the dust outlet shares the same vapor space as the cyclone feed gas inlet, gas recycle is never a problem. The problem appears in generally closed cyclones where gas discharged with solids from the device has no easy way back into the cyclone, but the problem can appear to some extent even in open-bottom cyclones.

In fluid catalytic cracking, catalyst having a particle size and color resembling beach sand circulates between a cracking reactor and a catalyst regenerator. In the reactor, hydrocarbon feed contacts a source of hot, regenerated catalyst. The hot catalyst vaporizes and cracks the feed at 425° C. to 600° C., usually 460° C. to 560° C. The cracking reaction deposits coke on the catalyst, thereby deactivating it. The cracked products are separated from the coked catalyst. The coked catalyst is stripped of volatiles, usually with steam, in a catalyst stripper and the stripped catalyst is then regenerated. The catalyst regenerator burns coke from the catalyst with oxygen-containing gas, usually air. Decoking restores catalyst activity and simultaneously heats the catalyst to, e.g., 500° C. to 900° C., usually 600° C. to 750° C. This heated catalyst is recycled to the cracking reactor to crack more fresh feed. Flue gas formed by burning coke in the regenerator may be treated for removal of particulates and for conversion of carbon monoxide, after which the flue gas is normally discharged into the atmosphere.

One failure mode in FCC is erosion of the cyclone caused by years of operation with high velocity, catalyst fines-laden gas passing through the cyclones. Refiners do not like to use high internal cyclone velocities, but are driven to them because of the need to improve cyclone efficiency. The FCC unit must operate without exceeding local emission limits on particulates. The catalyst is somewhat expensive, and most units have over a hundred tons of catalyst in inventory. FCC units circulate tons of catalyst per minute. Large circulation rates are needed because feed rates are large, and for every ton of oil cracked, roughly 5 tons of catalyst are needed.

These large amounts of catalyst must be removed from cracked products lest the heavy hydrocarbon products be contaminated with catalyst fines. Even with several stages of cyclone separation some catalyst fines invariably remain with the cracked products. These concentrate in the heaviest product fractions, usually in the main FCC fractionator bottoms, sometimes called the slurry oil because so much catalyst is present. Refiners may let this material sit in a tank to allow some entrained catalyst to drop out, producing CSO or clarified slurry oil.

The problems are as severe or even worse in the regenerator. In addition to the large amounts of catalyst circulation needed to satisfy the demands of the cracking reactor, there is an additional internal catalyst circulation that must be dealt with. In most bubbling bed catalyst regenerators, an amount of catalyst equal to the entire catalyst inventory will pass through the regenerator cyclones every 15–30 minutes.

Most units have several hundred tons of catalyst inventory. Any catalyst not recovered using the regenerator cyclones, typically comprising two stages of cyclones, will remain with the regenerator flue gas, unless a third stage separator, electrostatic precipitator or some sort of removal stage is added at considerable cost.

Many refiners use a power recovery system. The energy in FCC regenerator flue gas drives the air blower supplying air to the regenerator. The amount and particle size of fines in most FCC flue gas streams exiting the regenerator is enough to erode turbine blades if a power recovery system is installed. Generally a third stage separator unit is installed upstream of the turbine to reduce the catalyst loading and protect the turbine blades, especially from particles greater than 10 $\mu$m in size. Some refiners even now install electrostatic precipitators or some other particulate removal stage downstream of third stage separators and turbines to further reduce fines emissions.

Many refiners now use high efficiency third stage cyclones to decrease loss of FCC catalyst fines and/or protect power recovery turbine blades. It should be mentioned that whenever a third stage separator is used to clean up regenerator flue gas a fourth stage separator is typically used to process the underflow (solids rich portion) discharged from the third stage separator. Gas volumes in the fourth stage separator are small because third stage cyclone designs minimize the amount of gas discharged with the solids. Typically 0.5 to 3% of the flue gas is removed with the solids discharged from the third stage separator. Third stage separators limit gas discharged with solids (gas in the underflow) to that needed to fluidize and discharge solids from the third stage separator.

For these reasons, small size particles and relatively low gas volumes, the fourth stage separator generally comprises small diameter cyclones, a hot sintered metal or ceramic filter, or a bag house.

Most refiners are satisfied with their primary and secondary cyclones or equivalent means for recovering catalyst from flue gas and discharging recovered catalyst back into the regenerator. The troublesome separation is downstream of the regenerator in the third stage separator or TSS unit. The TSS must produce gas with essentially no particles greater than 10 microns (when power recovery turbines are used) and/or achieve sufficient removal of fines to meet emissions particulates regulatory limits.

Modern, high efficiency third stage separators typically have 50 to 100 or more small diameter cyclones. One type of third stage separator is described in "Improved Hot-Gas Expanders For Cat Cracker Flue Gas," *Hydrocarbon Processing*, March 1976. The device is fairly large, a 26-ft diameter vessel. Catalyst laden flue gas passes through many swirl tubes. Catalyst is thrown against the tube walls by centrifugal force. Clean gas is withdrawn up via a central gas outlet tube while solids are discharged through two blowdown slots in the base of an outer tube. The device removed most 10 micron and larger particles. The unit processed about 550,000 lbs/hour of flue gas containing 300 lbs/hour of particles ranging from sub-micron fines to 60 micron sized catalyst particles. This corresponds to an inlet loading of about 680 mg/Nm$^3$.

The solids loading on various cyclones in various parts of the FCC process varies greatly. The third stage separator has the most difficult separation in terms of particle size, while the primary separators typically do 99% of the solids recovery. This can be put into perspective by considering what happens in an exemplary FCC unit. In this exemplary unit the separation progresses as shown below in Table A, going from the primary and secondary cyclones making the initial separation of catalyst from flue gas in the regenerator through the TSS as final separation for the gas stream. The separated dust from the TSS is withdrawn to the fourth stage. Gas from the fourth stages merges with that of the third stage. Total emissions are 0.0474 tons/hr, corresponding to a loading of 215 mg/Nm$^3$.

TABLE A

|  | CYCLONE STAGE | | | |
| --- | --- | --- | --- | --- |
|  | 1$^{st}$ | 2$^{nd}$ | 3$^{rd}$ | 4$^{th}$ |
| CYCLONE INLET | | | | |
| Tons/hr solid | 500 | 5.0 | 0.15 | 0.108 |
| Average particle size, microns | 65 | 40 | 13 | 17 |
| Tons/hr gas | 275 | 275 | 275 | 8 |
| Weight gas/weight solids | 0.55 | 55 | 1833 | 74 |
| CYCLONE GAS OUTLET | | | | |
| Tons/hr solid | 5.0 | 0.15 | 0.042 | 0.0054 |
| Average particle size, microns | 40 | 13 | 1.5 | 5 |
| Tons/hr gas | 275 | 275 | 267 | 8 |
| % gas via gas outlet | 100 | 100 | 97 | 100 |
| % solids removal/stage | 99 | 97 | 72 | 95 |
| CYCLONE SOLIDS OUTLET | | | | |
| Tons/hr solid | 495 | 4.85 | 0.108 | 0.1026 |
| Average particle size, microns | 65 | 41 | 17 | 18 |
| Tons/hr gas | ~0 | ~0 | 8 | ~0 |
| % gas via solids outlet | ~0 | ~0 | 3 | ~0 |
| weight gas/weight solids | ~0 | ~0 | 74 | ~0 |

The total solids throughput per cyclone is expressed as tons per hour. The average particle size of the solids feed to each cyclone changes markedly. Larger particles are preferentially removed so each downstream stage, through the third stage, sees fewer solids with a much smaller particle size distribution.

The first stage or primary cyclones do most of the work, generally recovering more than 99% of the total solids in a single stage. The first stage cyclones also have the easiest job, in that the particles are relatively large, around 60–80 microns, there are large amounts of gas available to generate centrifugal forces, and the discharge of significant amounts of flue gas down the cyclone dipleg has no adverse consequences. The solids loading is high. The first stage cyclone removes large amounts of solids using large amounts of gas to generate centrifugal forces. Some gas is discharged with the solids, as gas is needed to maintain fluidization of the recovered solids. This entrained gas simply recycles through the bed of catalyst in the regenerator and returns into the inlet horn of the first stage or primary cyclone.

The secondary FCC regenerator cyclones treat as much gas as the primary cyclones, but orders of magnitude less solids. Secondary cyclones recover typically around 95–98% of the solids charged to them. The secondary cyclones can recover additional amounts of particulates from gas discharged from the primary cyclones. This is because lower solids loadings in the secondary cyclones permit higher gas velocities to be used in secondary cyclones than in primary cyclones. Higher gas velocities develop higher centrifugal forces to improve efficiency. The second stage cyclone has about the same gas flow as the first, but orders of magnitude less solids. Small amounts of solids are discharged from the second stage cyclone diplegs, with small amounts of gas. As is the case in the first stage, this gas simply reenters the FCC regenerator atmosphere. This gas becomes a small part of the gas feed to the first stage cyclone.

Because primary and secondary cyclones are so efficient, essentially all of the easy-to-remove particles are removed after two stages of cyclone separation. Only fines, irregularly shaped fragments of FCC catalyst, remain in the gas to the third stage separator. Third stage separator cyclone operation is characterized by large volumes of gas and small amounts of extremely fine particulates, much of it smaller than 5 microns. Each downstream stage, from the first stage through the third stage, sees less solids and smaller particles. Much more gas per unit weight of solids is discharged via the solids outlet in third stage separators as compared to cyclones in the regenerator. On a weight basis, more than 10 grams of gas are discharged per 1 gram of fines discharged to the catch chamber of TSS cyclones. Contrast this with operation in first and second stage cyclones in the FCC regenerator, where 1 gram of gas transports over 1000 grams of FCC catalyst down a dipleg. It can be said that from 10,000 to 100,000 times as much gas is present in third stage separator solids discharge stream as compared to solids discharge via the dipleg of a primary cyclone. In part because of the relatively small amounts of solids involved, and large gas volumes, typically 5 orders of magnitude more gas relative to solids, many TSS cyclones are open-bottom.

After the gas leaves the gas outlet of the third stage separator, it has a sharply reduced solids content as compared to say the gas from the first stage cyclone. Although there is not much solids loading at this point, the amount of solids may be sufficient to destroy or damage power recovery turbines, and may exceed local existing or projected limits on particulates emissions, which at several localities are as low as 50 mg/Nm$^3$.

These developments are somewhat surprising in view of the many improvements which have occurred both in cyclone efficiency and catalyst properties. Cyclone efficiency has improved during the 50 years FCC has been in use in refineries. FCC catalysts are stronger and more attrition resistant. These factors (better cyclones, stronger catalyst), if considered alone, would make FCC flue gas cleaner. Offsetting factors have included an increase in catalyst circulation rates, multiplying the load on the cyclones. Higher cyclone efficiencies are achieved by using higher velocities in the cyclones to generate stronger centrifugal forces. The high velocities can fracture or break even modern attrition-resistant catalysts to produce more fines which are harder to recover and also tend to wear out the cyclones. High efficiency (and high velocity) cyclones increase fines recovery, but the gas makes more turns in the cyclone body, increasing catalyst attrition.

Particle recovery in conventional large diameter cyclones associated with the FCC regenerator had reached a plateau. Refiners resorted to third stage separators (TSS) with many small diameter cyclones to increase particulate removal from FCC flue gas. Mechanically, third stage separators are complex. Many TSS cyclones are needed to handle the large volumes encountered in FCC flue gas streams. Each cyclone is of small diameter and is mounted either vertically or horizontally. One cyclone manufacturer uses many small cyclones, 10 inches in diameter, to increase centrifugal forces and reduce radial distance to a wall where solids could collect. Since many cyclones are needed, it is generally necessary to install them in a single vessel, acting as a manifold. The TSS unit made it easier for particles to reach the wall of the cyclone by reducing the distance to the cyclone walls. The offsetting factor is some increase in pressure drop, and considerable capital expense for a unit which made only a modest improvement in fines removal.

TSS units allowed refiners to reach a new level of solids recovery, but known TSS units were not always adequate for refiners wanting to use power recovery turbines. Refiners were at an impasse for improving TSS cyclone efficiency. Then, the innovations of Chitnis et al. (U.S. Pat. No. 5,681,450) improved the operation of cyclones, especially their performance on the less than 5 micron particles, which are difficult to remove in conventional cyclones and difficult and costly to remove using electrostatic precipitation. These improvements reduced dust re-entrainment from TSS units. TSS cyclones had not satisfactorily addressed the problem of how to deal with gas discharged with the solids. Relatively large amounts of gas are discharged with solids whether solids are discharged tangentially via a slot cut in a sidewall of the cyclone barrel or axially via an open bottom solids outlet opposite the clean gas outlet. In some TSS cyclones there is no dipleg and no place for de-aeration of solids. The solids are discharged at a relatively high velocity and may aspirate a significant amount of gas. Rather than gas fluidizing the solids, the solids are carrying out excessive amounts of gas. At the solids outlet of TSS cyclones, the considerable kinetic energy in the solids carries gas from the cyclone body. Chitnis et al. wondered what happens to this gas, and observed significant and fluctuating flow of gas out of and into the longitudinal slot of test cyclones, which seemed chaotic. Gas from one cyclone flowed into the catch chamber and then reentered the same cyclone as well as other cyclones. Reducing length and width of the slot seemed to reduce the gas flow and the interaction between the cyclones.

Chitnis et al. realized the discharged catalyst always carried gas with it into the catch chamber where it had no place to go. Only a minor amount of this gas was needed for the underflow. Much larger amounts of gas exited the cyclone, and re-entered the cyclone in some way. Chitnis et al. observed localized pulses of catalyst/gas discharge alternating with reverse flow of gas back into the barrel slot. This was the only way for gas discharged with the solids-rich phase to return to the cyclones from the catch chamber, as there was not enough gas removed with the solids phase from the bottom of the device to mass balance the cyclones. Chitnis et al. concluded that all TSS cyclones unintentionally recycle or reflux gas back through the solids outlet into the cyclone body. Refluxing gas entrained solids back into the inner vortex of the cyclone and out the gas outlet tube. The problem stemmed from the way the gas returns into the cyclone body of the cyclone. Without some other means for gas reflux, a reverse flow, chaotic or randomly fluctuating in space and time, refluxed this gas via the solids outlet. This gas reflux flow was countercurrent to flow out of the solids discharge. A cyclone could alternate between a high solids discharge phase and a lower solids reflux phase. Another alternative was for one end of an outlet slot to discharge solids while the other end of the slot permitted reflux back into the cyclone. In either case the effect of chaotic reflux via the solids outlet was to disrupt gas streamlines of the tangential flow within the cyclone body.

Chitnis et al. Week able to stabilize the cyclone operation, and roughly halve the amount of fines discharged from the gas outlet tube, by providing a separate gas reflux means, preferably in the bottom of the cyclone body. Still, further improvements in the solids separation in the Chitnis et al. third stage separator cyclones were desired.

SUMMARY OF INVENTION

The present invention concerns the discovery of secondary re entrainment of catalyst particles in third stage separator cyclones, and the use of shields to enhance solid separation and reduce the solids entrainment in the gas discharge from a low-chaos gas/solid cyclone separator. Cold flow studies have shown that shields installed on the Chitnis et al. cyclones remarkably improved their performance. The shields prevent secondary re-entrainment of catalyst already separated from the settling chamber. This secondary entrainment phenomenon is termed "cross-talk." The shields, preferably in the form of tubes, function as baffles around the bottom end of the reflux tubes to substantially inhibit this cross-talk. Particularly where the cyclones are spaced relatively closely together and terminate at different heights, the shields substantially prevent solids discharged from the solids outlet of an adjacent cyclone from being re-entrained in the gas recycle into the gas reflux openings in the cyclones.

In one aspect, the present invention provides an external separator housing a plurality of cyclones in an external separator vessel. The separator is useful, for example, in a fluidized catalytic cracking process wherein a hydrocarbon feed is catalytically cracked by contact with a regenerated cracking catalyst in a cracking reactor to produce lighter products and spent catalyst, and spent catalyst is regenerated in a catalyst regenerator having one or more separators for recovery of catalyst and fines from flue gas to produce regenerated catalyst that is recycled to the cracking reactor, and regenerator flue gas containing catalyst fines. The external separator removes at least a portion of the fines from the regenerator flue gas stream. Each of the cyclones has a cyclone body, a flue gas inlet, a gas outlet tube, a gas reflux opening, and a shield. The cyclone body has a length, a longitudinal axis, an inlet end and an outlet end. The flue gas inlet is in fluid communication with the inlet end of the cyclone body. The gas outlet tube in the inlet end of the cyclone body has a longitudinal axis aligned with the longitudinal axis of the cyclone body for withdrawing gas with a reduced fines content. The solids outlet is disposed in the outlet end of the cyclone body for discharge of fines and a minor amount of gas into a catch chamber in a lower portion of the external separator vessel. The gas reflux opening is disposed in the outlet end of the cyclone body, fluidly isolated from the flue gas inlet at the inlet end of the cyclone body, for recycling a portion of the gas discharged with the solids through the solids outlet from the catch chamber back into the cyclone body. The shield extends downwardly from the outlet end of the cyclone body around the gas reflux opening to inhibit solids from being entrained in the gas recycled through the gas reflux opening into the cyclone body.

The cyclone body is preferably cylindrical and the solids outlet can include an opening in a sidewall for tangential discharge of fines and a minor amount of gas into the catch chamber. The gas reflux opening can be a hole or a cylindrical tube having a longitudinal axis aligned with the longitudinal axis of the cyclone body and passing through a seal in the outlet end of the cyclone body. The gas reflux tube preferably discharges gas reflux tangentially into the cyclone body. The feed gas inlet preferably discharges gas tangentially or axially into the cyclone body.

When the gas reflux opening is a tube, it can extend within the cyclone body from 0 to 1 cyclone body lengths and/or extend outside the cyclone body into the catch chamber from 0 to 1 cyclone body lengths. Swirl vanes can be fluidly associated with the gas reflux opening. Either or both of the gas reflux entry into the gas reflux tube and the gas reflux exit from the gas reflux tube can be tangential. Preferably, the tangential discharges of the gas reflux tube and the feed gas inlet both induce spin in the same direction within the cyclone body.

The shield can be any suitable shape, but is preferably cylindrical with an open lower end, and preferably has a cross sectional area larger than the gas reflux opening. A lower end of the shield preferably terminates below a lower end of any lower end of the gas reflux tube. An upper end of the shield is preferably contiguous with the outlet end of the cyclone. The shield preferably terminates at a lower end spaced above any dense phase of solids in the catch chamber.

In another aspect, the invention provides a cyclone separator that has a closed-bottom cyclone body having a length and a longitudinal axis. A feed gas inlet is disposed at an inlet end of the cyclone body for a stream of gas and entrained solids. A gas outlet tube in the inlet end has a longitudinal axis aligned with the longitudinal axis of the cyclone body for withdrawing gas with a reduced entrained solids content. A solids outlet is disposed in a sidewall of the cyclone body for tangential discharge of solids and a minor amount of gas from the closed-bottom cyclone into a catch chamber. A gas reflux opening is fluidly isolated from the feed gas inlet for recycling gas from the catch chamber back into the cyclone body. A shield extends downwardly from the cyclone body around the gas reflux opening. The gas reflux opening can include a tube extending within the cyclone body from 0 to 1 cyclone body lengths and extending outside the cyclone body into the catch chamber from 0 to 1 cyclone body lengths. The shield preferably extends downwardly from the cyclone body to below any lower end of the gas reflux tube.

In yet a further aspect, the present invention provides a cyclone separator, which has a gas reflux tube passing through and sealingly affixed to a closed end of an at least partially cylindrical cyclone body having a length, a diameter and a longitudinal axis. The reflux tube has (a) a diameter smaller than the diameter of the cyclone body, (b) a reflux inlet outside the cyclone body, and (c) a reflux exit inside the cyclone body. The cylindrical cyclone body has the sealed end as one end thereof, and a gas outlet tube, sealingly affixed and passing through an opposing end of the cyclone body. The gas outlet tube has a diameter smaller than the diameter of the cyclone body and a longitudinal axis axially aligned with the cyclone body. The reflux exit is in a portion of the gas reflux tube which is axially aligned with the gas outlet tube. A tangential gas and solids inlet fluidly connects with the opposing end of the cyclone body end receiving gas and entrained solids. A solids outlet is provided for discharging a concentrated solids stream with a minor portion of gas from the cyclone body via at least one opening in a sidewall of the cyclone body near the sealed end. The solids outlet and the gas reflux inlet are fluidly connected outside of the cyclone body. A shield is disposed between the solids outlet and the gas reflux inlet to inhibit entrainment of solids from the solids outlet into the gas reflux inlet. Preferably, the reflux tube extends on either side of the cyclone body by a distance equal to 0 to 100% of the length of the cyclone body, and the shield extends downwardly from the cyclone body to below any lower end of the gas reflux tube below the cyclone body.

A still further aspect of the present invention is that it provides a multi-cyclone gas/solids separator that has a plurality of cyclones spaced horizontally apart from adjacent cyclones. Each cyclone has a cyclone body including a feed inlet end for admitting gas and entrained solids into an annular space defined by a sidewall of the cyclone body and a cylindrical gas outlet tube axially aligned with the cyclone body. A solids outlet at an opposing end of the cyclone body has a tangential outlet for solids and a minor amount of gas through a sidewall of the cyclone body. A gas reflux opening is axially aligned with the outlet tube. The plurality of cyclones share both a common catch chamber for solids discharged from the solids outlet, and a common manifold for supply of gas and entrained solids. A plurality of shields positioned in the catch chamber inhibit discharge of solids from the tangential outlet of the adjacent cyclones into a vicinity of an inlet of the gas reflux opening. The gas reflux opening preferably includes a tube having an interior portion within the cyclone body and an exterior portion extending into the catch chamber, wherein the interior portion includes imperforate sidewalls and open ends, and the exterior portion has a cylindrical tube sealed at the end extending downwardly into the catch chamber surrounded by a said shield having a diameter larger than the downwardly extending cylindrical tube. The shield preferably has a lower end terminating below a lowermost end of the downwardly extending cylindrical tube.

Furthermore, the present invention provides in another aspect, an improvement in a multi-cyclone gas/solids separator comprising a plurality of cyclones spaced horizontally apart from adjacent cyclones, each comprising a cyclone body having (i) a feed inlet end for admitting gas and entrained solids into an annular space defined by a sidewall of the cyclone body and a cylindrical gas outlet tube axially aligned with the cyclone body; (ii) a solids outlet at an opposing end of the cyclone body having a tangential outlet for solids and a minor amount of gas through a sidewall of the cyclone body; and (iii) a gas reflux opening axially aligned with the outlet tube, wherein the plurality of cyclones share both a common catch chamber for solids discharged from the solids outlet, and a common manifold for gas and entrained solids. The improvement comprises a plurality of shields positioned in the catch chamber to inhibit discharge of solids from the tangential outlet of the adjacent cyclones into a vicinity of an inlet of the gas reflux opening. The shields are preferably cylindrical tubes extending downwardly from the solids outlet end of the cyclone body around the gas reflux openings. The shields can have a diameter greater than the gas reflux openings and an open lower end. The lower ends of the shields preferably terminate below a lower end of the gas reflux openings, and above a level of dense phase solids in the catch basin. The lower ends of the shields depending from the cyclone bodies preferably terminate at about the same height in the catch basin.

Another aspect of the invention is the provision of apparatus for separating a gas-solids mixture. The apparatus includes a closed bottom cyclone, a gas reflux opening in a lower end of the cyclone, and a shield depending from a lower end of the cyclone around the gas reflux opening. The shield is preferably contiguous with the cyclone to surround the gas reflux opening. The gas reflux opening preferably includes a tubular passage. The shield can be a concentric tube having an inside diameter larger than an outside wall of the tubular passage. The tube preferably terminates below a lowermost end of the tubular passage.

A further aspect of the invention is a method for separating a gas-solid mixture. The method includes the steps of introducing the mixture to respective inlets of a plurality of adjacent closed-bottom cyclones, discharging solids lean gas from upper ends of the respective cyclones, discharging solids containing entrained gas from tangential outlets at lower ends of the respective cyclones, refluxing a portion of the entrained gas into the cyclones through reflux openings formed in lower ends of the respective cyclones, and shielding the reflux openings from the tangential outlets to inhibit cross-talk.

Another aspect of the invention is an apparatus for separating a gas-solid mixture. The apparatus includes means for introducing the mixture to respective inlets of a plurality of adjacent closed-bottom cyclones, means for discharging solids-lean gas from upper ends of the respective cyclones, means for discharging solids containing entrained gas from tangential outlets at lower ends of the respective cyclones, means for refluxing a portion of the entrained gas into the cyclones through reflux openings formed in lower ends of the respective cyclones, and means for shielding the reflux openings from the tangential outlets to inhibit cross-talk.

BRIEF DESCRIPTION OF DRAWINGS

FIG. 3 is a simplified elevation of a cyclone with a re-entry shield according to one embodiment of the invention.

FIG. 4 is a simplified plan view of the cyclone of FIG. 3 a seen along the lines 4—4.

DETAILED DESCRIPTION

Figure 1:
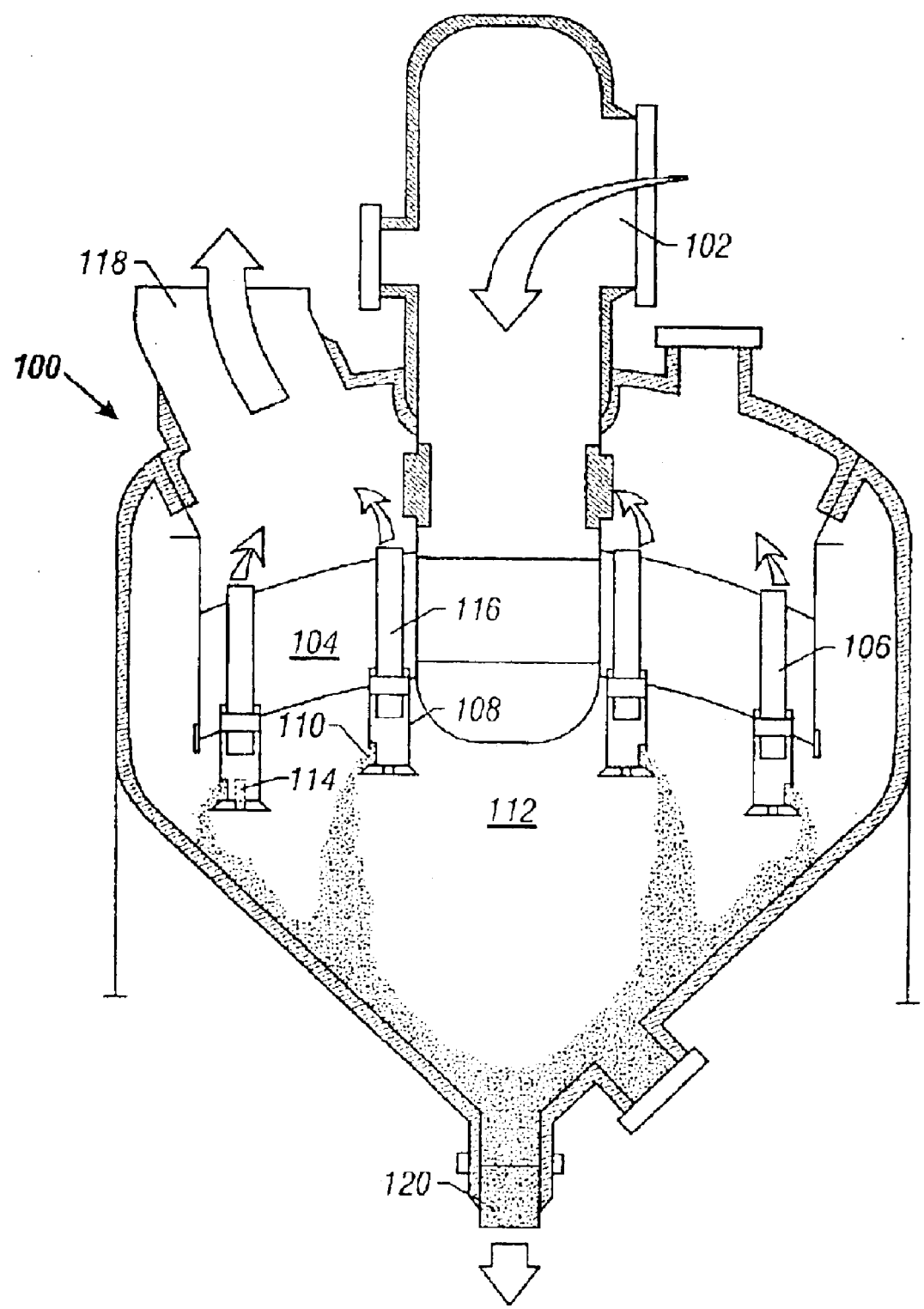
FIG. 1 (prior art) is a simplified schematic view of a prior art third stage separator showing closed-bottom cyclones with reentry tubes.

FIG. 1 (prior art) is a third stage separator (TSS) similar to the reduced chaos cyclone separator of U.S. Pat. No. 5,681,450 to Chitnis et al. TSS 100 receives a fines-containing FCC flue gas via inlet 102. The feed gas is distributed in plenum 104 to the inlets of a plurality of cyclones 106. Each cyclone 106 is equipped with entry swirl vanes (not shown; see FIG. 3) to induce a tangential flow pattern in a barrel 108. Fines collect on the wall of each barrel 108 and are discharged from each solids exit slot 110 formed in a lower end thereof. Gas discharged with the solids into the catch basin 112 re-enters each barrel 108 via a gas reflux tube 114. Clean gas is withdrawn via each outlet tube 116 and removed from the vessel via gas outlet 118. Solids that accumulate in the catch basin 112 are removed via solids outlet 120.

Each of the cyclones 106 has essentially the same dimensions, i.e. each barrel 108 has the same length and diameter. Since the height of the plenum 104 typically tends downward as it extends outwardly from the center of the vessel, the elevation of the solids exit slots 110 will likewise tend lower. Thus, the cyclones 106 at an outer position will have a solids exit slot 110 below the bottom of the cyclones 106 at an inner position. This difference in the height of the cyclones 106, we believe, contributes to cross-talk between the solids exit slots 110 and the lower end of the re-entry tubes 114. Pointing the solids exit slot 110 away from the adjacent cyclone 106 does not eliminate the cross-talk because there are usually hundreds of relatively closely-spaced cyclones 106 in the TSS 100. Also, cyclones 106 are relatively spaced in every horizontal direction, especially for the cyclones 106 intermediate the center and outer periphery of the TSS 100.

Figure 2:
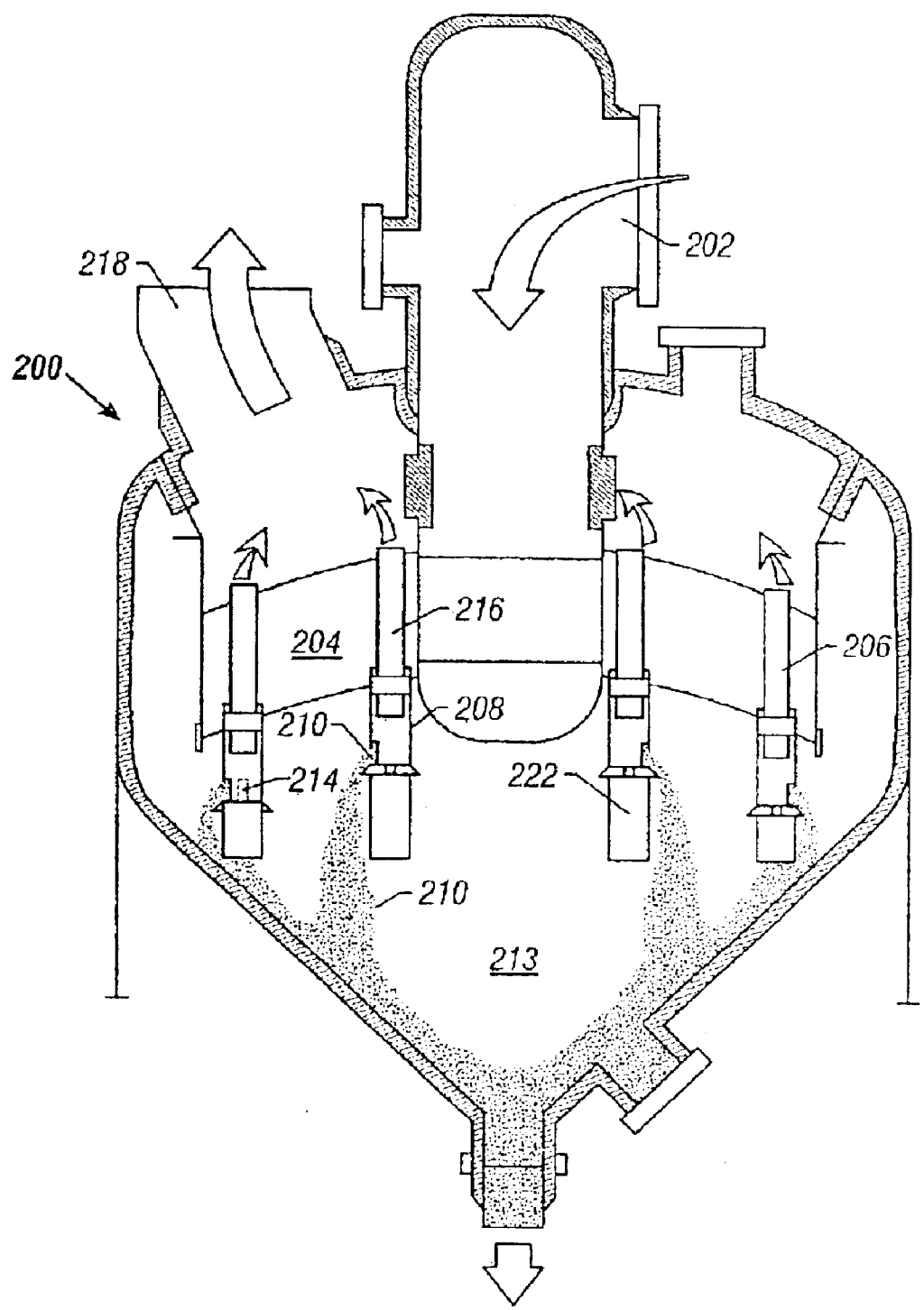
FIG. 2 is a simplified schematic view of the third stage separator of FIG. 1 after modification to include shield tubes according to the principles of one embodiment of the invention.

FIG. 2 shows the TSS of FIG. 1, wherein correspondence in the last two digits of the reference numerals in FIGS. 1 and 2 is used to indicate correspondingly similar parts. The cyclones 206 have been retrofitted with respective shield tubes 222 in accordance with the principles of the present invention. Although each barrel 208 of the cyclones 206 terminates at a different height in the catch chamber 212 relative to adjacent ones of the cyclones 206 that are closer to or farther away from center of the TSS 200, the shields 222 have an inversely corresponding length so that the lower ends of the shields 222 all terminate at about the same height, preferably above any dense phase of solids in the catch chamber 212.

FIG. 3 shows a simplified sectional view of a preferred cyclone of the invention, and FIG. 4 shows a bottom view of the same cyclone. The inlet gas and entrained solids enter axially in the annulus between the barrel 208 and the gas outlet tube 216 where they are tangentially directed by the swirl vanes 224. Gas flow spirals around the outlet tube 216. Centrifugal force throws the particulates to the wall of the barrel 208. Solids collect as a relatively thin, circulating layer of particles which are discharged through one or more tangential dust outlets 210. The cyclone 206 has a closed bottom 226 which is preferably a blind flange 228 bolted to a mating flange 230 at the lower end of the barrel 208. Gas re-entry is provided by a centrally disposed tube 214 passing through and/or secured to the blind flange 228. Although not required, the shield tube 222 conveniently has the same diameter as the barrel 208, and is welded or otherwise secured to the blind flange 228. In retrofitting a Chitnis et al. cyclone, the shield 222 is added to each cyclone by, for example, welding the shield tube 222 to the lower surface of the blind flange 228 supporting the re-entry tube 214.

Although the shielded re-entry cyclone 206 is described in one example in reference to the specific features of the cyclone 206 in FIGS. 2–4, it is readily appreciated that the shielded cyclone can take any form of the closed-bottom, gas-reflux equipped cyclones described in Chitnis et al. modified to include the shield 222 of the present invention.

The invention is further understood by reference to the following examples.

EXAMPLE COLD FLOW MODELING

The performance of axial entry cyclones with and without shields was studied in a large-scale cold flow unit. The cold flow unit was scaled down from a commercial design, and represented an existing third stage separator (TSS) design of Chitnis et al. in which catalyst particles had accumulated inside the gas reflux tubes of some of the TSS cyclones. The cold flow model had four operating and two non-operating cyclone elements, the size, inlet gas velocity and dust loading of which were typical at the outlet of a commercial FCC regenerator as indicated by a comparison of the design bases set out in Table 1:

TABLE 1

Refinery TSS Cold Flow Unit Design Basis

|  | TSS Cold Flow Model | Refinery TSS Design |
| --- | --- | --- |
| INLET |  |  |
| Number of windows | 2 | 16 |
| Flow split (nominal) (upper/lower), % | 60/40 | 60/40 |
| Window velocity, ft/s | 91 | 91 |
| Windows, H/W |  |  |
| Upper | 1.125 | 0.95 |
| Lower | 0.75 | 0.61 |
| Plenum Residence time, sec | 0.36 | 0.48 |
| CYCLONES |  |  |
| Number | 6 | 169 |
| ID, ins | 10 | 10 |
| Length, ft | 5 | 5 |
| Inlet Configuration | Swirl vane | Swirl vane |
| Swirl vane velocity, ft/s | 244 | 248 |
| Underflow, % | 3 | 3 |
| Dust outlet (H/W) | 1.67 | 1.67 |
| Dust slot size | 1.5" × 2.5" | 1.5" × 2.5" |
| Re-entry tube size | 1" sch 40 | 1" sch 40 |
| Gas velocity in re-entry tube, ft/s | 42 | 49 |
| Shield ID, in. | 10 | No shields |
| Gas velocity in shield tubes, ft/s | 0.4 | No shields |

Figure 5:
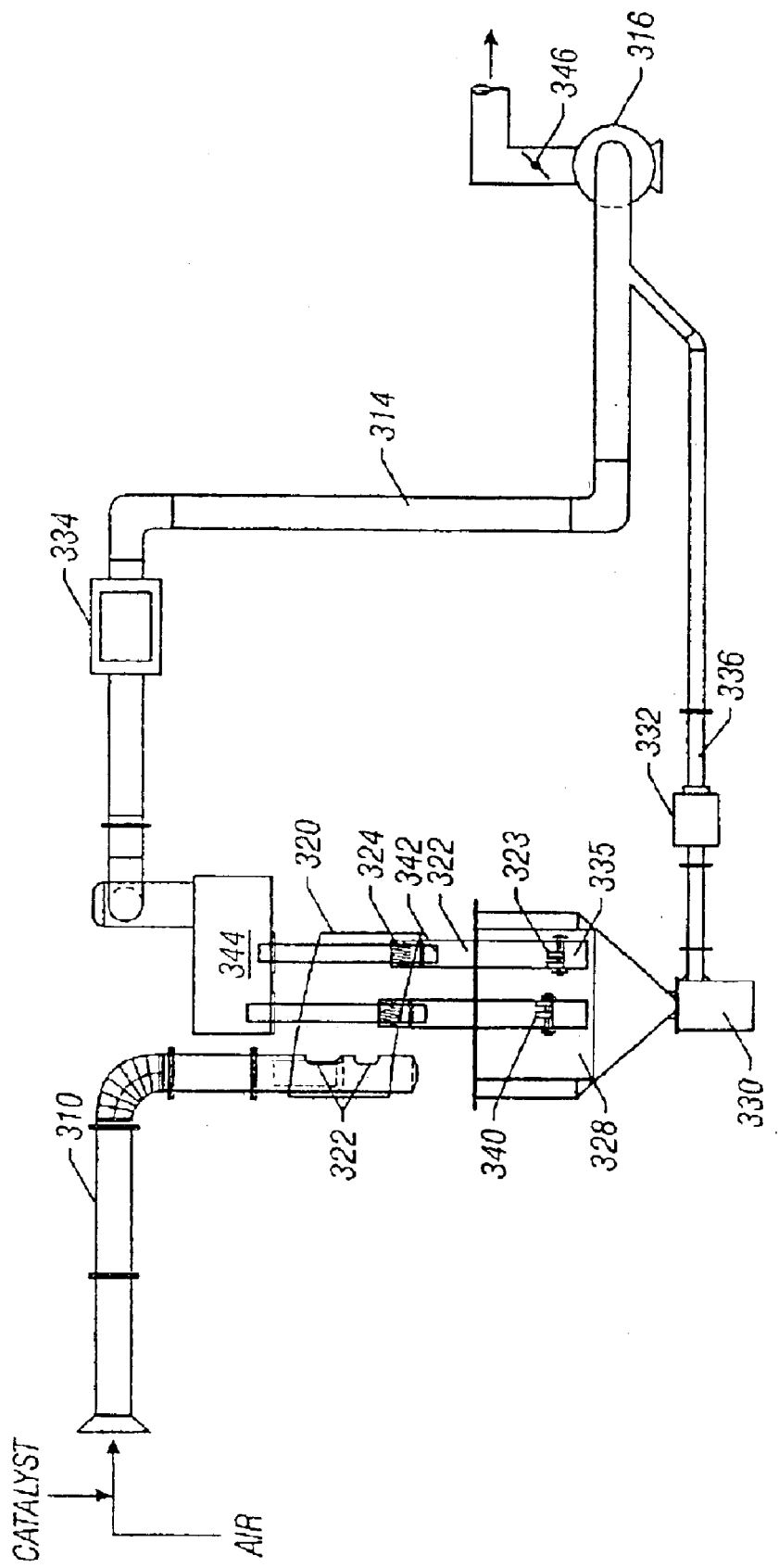
FIG. 5 is a simplified schematic view of test equipment for cold flow modeling of the cyclones of the present invention.
Figure 6:
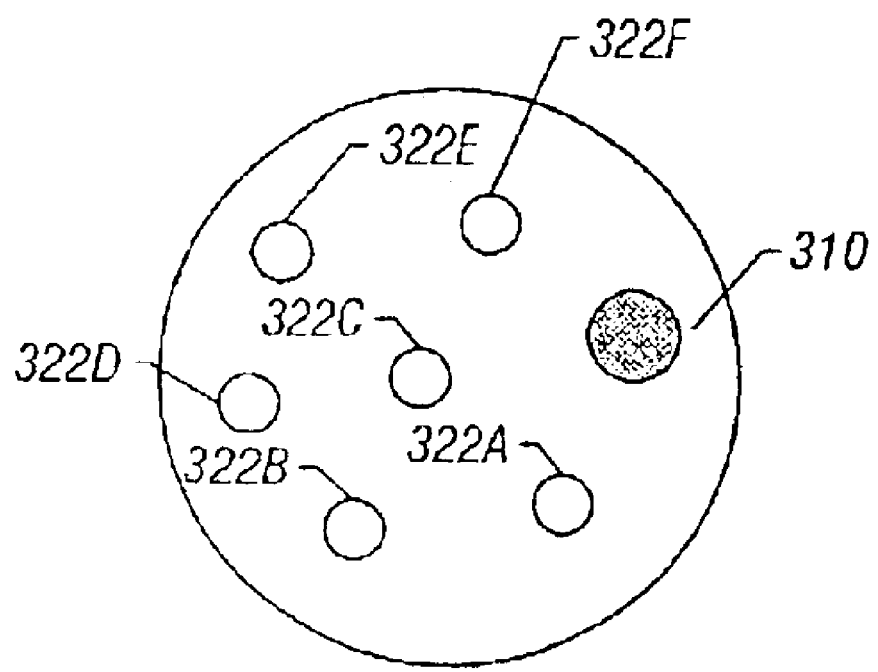
FIG. 6 is a simplified plan diagram showing the layout of the cyclones and inlet pipe in the test equipment of FIG. 5.

The schematic diagram of the test rig is shown in FIG. 5. The catalyst was fed, through air eduction, into the inlet pipe 310. The test facility was operated under vacuum by connecting the outlet gas filter exhaust 314 to the inlet of an air blower 316. The inlet pipe 310 was connected to the inlet plenum 320 through baffled windows 322. The baffle ensured good distribution of the incoming dust-laden air into the inlet plenum 320. The inlet plenum 320 was curved in a manner typical of a commercial TSS design. The catalyst-laden air entered the axial flow cyclones 322 through their swirl vanes 324. FIG. 6 shows the plan of the layout of the inlet pipe 310 and cyclones 322 (identified as cyclones 322A through 322F in FIG. 6) over the settling chamber 328. Cyclones 322A through 322F were arranged on a triangular pitch as in a typical TSS. The cyclone body 326 terminated into the settling chamber (holding vessel) 328 below the inlet plenum 320, which had a diameter to match the upflow in a typical commercial TSS. The concentrated dust and entrained gas exited the cyclones 322 through the solids exit slot 323 into the settling chamber 328. Part of the gas with the concentrated dust was vented through the underflow pot 330, and then filtered at 332 before it was combined with the clean gas from the gas outlet filters 334 prior to entering the suction of the air blower 316. The gas flow rate through the underflow line 336 was measured and controlled by a butterfly valve (not shown). The dust in the underflow gas was removed in the underflow filter 332.

The excess gas stream that entered the settling chamber 328 through the solids exit slot flowed back into the cyclones 322 through the re-entry tube 340 located at the bottom of the cyclone 322. The section of the cyclone 322 containing the dust exit slot 323 and the re entry tube 340 was designed as a separate spool piece to allow quick re-orientation of the dust slot discharge. The clean gas exited the cyclone through pipe 342 into the outlet plenum 344 from where it flowed through the outlet filters 334 to remove any entrained catalyst particles. The clean gas, combined with the clean underflow gas, then flowed via line 314 into the suction of the blower 316. The gas flow was measured but not controlled. The overall gas flow rate through the unit (and unit pressure) was manually controlled with the damper 346 at the exit of the blower 316. The unit was instrumented throughout with hot wire anemometers, pitot tubes, manometers and pressure gauges for flow and pressure measurements, including provisions for helium gas tracer work and mapping of gas velocities in the cyclone 322 and plenum chamber.

Each cyclone 322 had an inside diameter of 10 inches and a length of 5 feet. The dust outlet slot measured 2.5 inches high by either 1 or 1.5 inches wide. The re-entry tube 340 was nominal 1 inch, 2 inch or 3 inch pipe. The gas velocity through the swirl vanes 324 was about 240–250 ft/s, and the dust loading was 0.332 grains per actual cubic foot. At a gas underflow rate of 3 percent, the gas velocity in the 1-inch re-entry tube 340 was about 40–50 ft/s.

A catalyst feed mixture was prepared by mixing together 22.5% by weight of fresh FCC equilibrium catalyst, 44% by weight of the fourth stage catch from a refinery and 33.5% by weight of the electrostatic precipitator catch from the refinery. The proportions were selected to match as closely as possible the typical commercial TSS inlet particle size distribution and thoroughly mixed before use. Approximately 0.002 lb/lb of LAROSTAT 519

Figure 7:
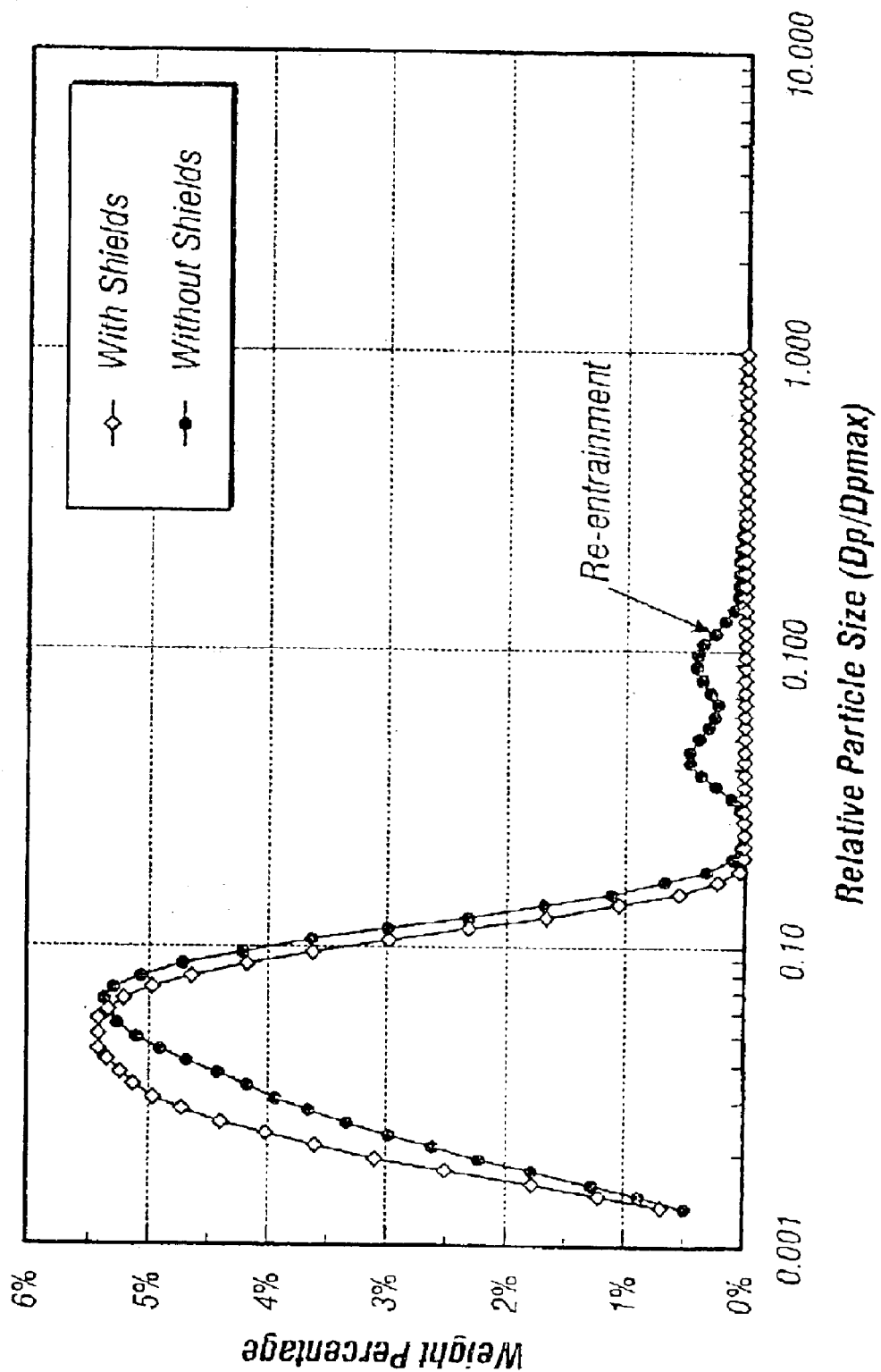
FIG. 7 is a graphical presentation of particle size distribution in the gas outlet from the third stage separator cyclones equipped with shields (-◊-◊-◊-) according to the present invention and without shields (-●-●-●-) according to the prior art.

The shields 335 had the same inside and outside diameters as the main body of the cyclones 322, and each of the shields 322 terminated at the same height as the other shields 335, well below the lower end of the re-entry tubes 340 but above the upper level of the dense bed in the settling chamber 328. The cyclones of the TSS did not terminate at the same elevation in the settling chamber 328 because of the curvature of the inlet plenum 320. Consequently, some of the dust slots discharged towards the entrance of some re-entry tubes 340. The gas entering the cyclones 322 from the settling chamber 328 also re-entrained catalyst because of the net upwards velocity inside the chamber 328. Test results showed that the shields 335 were beneficial to the operation of the TSS. They increased the overall collection efficiency of the cyclones 322 by almost 6 percent, and eliminated all the particles greater than 10 $\mu$m in the clean gas stream exiting the cyclones 322 without shields 335. As shown in FIG. 7, a comparison of the particle distribution for the TSS elements with and without shields 335 showed that there were no particles larger than 10 $\mu$m in the clean gas after the shields 335 were installed. The cut size (the maximum particle size in the clean gas outlet of the TSS) was essentially unchanged by the installation of shields 335. In other words, the shields 335 did not adversely affect the primary operation of the cyclones 322; they only eliminated or reduced secondary particle re-entrainment from the settling chamber 328. The results from the cold flow modeling demonstrated that the overall performance of the TSS was enhanced by eliminating secondary re-entrainment from the settling chamber by the installation of shields. The secondary re-entrainment is the result of catalyst particles that exit from one cyclone in close proximity to the gas reflux tubes of adjacent cyclones and are aspirated into an adjacent cyclone through its reflux tube.

The dust settling chamber 328 showed strong clock-wise (top view) circulation of air as indicated by broad bands of dusts moving in a descending pattern along the wall. The dust bands were lifted near the dust outlet cyclones 322E, 322F and flowed downwards in the vicinity of cyclone 322A, suggesting that the proximity of the outlet of the various cyclones 322 to the chamber 328 wall and the orientation of the cyclone dust outlet slots primarily determine the rotation speed and direction. The pairing of left spinning with right spinning cyclones was not sufficient to eliminate rotation in the chamber 328. This rotational motion in the settling chamber 328 did not change when cyclone 322E was isolated from the gas flow path. The rotation in the settling chamber 328 was still fairly strong after turning the underflow off, suggesting that a substantial fraction of the air exited through the cyclone dust slots and then re-entered through the re-entry tubes 340. Increasing the re-entry tube 340 size, adding shields 335 or blocking some re-entry tubes 340 did not change the gross circulating pattern in the settling chamber 328.

The performance of the different cyclone configurations tested in this example were compared on the basis of their collection efficiencies and residual catalyst with size greater than 10 $\mu$m in the clean gas. The configurations tested were:

Base design (1" re-entry tubes 340 and without shields 335)

Cyclone with 1" re-entry tubes 340 and shields 335

Cyclone with 3" re-entry tubes 340 and shields 335

Adding shields 335 to the cyclone 322 with the 1" re-entry tube 340 increased efficiency from 83.7 to 90%. Enlarging the re-entry tube 340 diameter from nominal 1" to nominal 3" decreased the collection efficiency by almost 2%.

The effects of varying the underflow percent (1–5%), nominal cyclone inlet velocity (100–250 ft/s), dust loading, plugged re-entry tubes, plugged swirl vanes, plugged inlet window, finer particle size, and larger re-entry tube size (2- and 3-in.), were also investigated.

The effect of underflow rate on the cyclone 322 performance was studied systematically at cyclone inlet velocity of 195 ft/s for the base cyclone design without shields. The results showed that the cyclone efficiency increased with underflow rate up to 4% underflow rate and then the efficiency appeared to show a slight decrease as the underflow rate increased. The cyclone efficiency for the 3" re entry tube cyclone appeared to be insensitive to underflow rate above 4%. The slight drop in efficiency beyond 4% underflow rate for the base design could have been due to increased turbulence in the settling chamber as a result of the separated catalyst particles. The presence of shields and reduction in the re-entry velocity for the cyclones with the 3" re-entry tubes and shields appeared to reduce the re-entrainment of catalyst particles as the underflow rate was increased. Increasing the underflow rate at constant cyclone inlet velocity did not increase the amount of +10 $\mu$m materials in the clean gas.

The effects of cyclone inlet velocity at constant underflow rate of 3% on the performance of the base cyclone design showed that cyclone efficiency increased from approximately 81% through a maximum of 87% and then dropped slightly as the cyclone inlet velocity was increased from 110 ft/s to 249 ft/s. The maximum efficiency occurred at a cyclone inlet velocity of 200 ft/s. Below a cyclone inlet velocity of 185 ft/s, all catalyst particles collected from the clean gas were less than 10 $\mu$m in diameter. The concentration of +10 $\mu$m particles in the clean gas increased sharply at cyclone inlet velocities greater than 190 ft/s. At the maximum velocity investigated, the concentration of +10 $\mu$m particles was 10 mg/Nm$^3$.

The cyclone pressure drop between the inlet and outlet plenums increased with cyclone 322 inlet velocity. The cyclone 322 pressure drop was generally related to the cyclone 322 inlet velocity by the following equation:

$$\Delta P = 0.00107 \, \rho \, Vel^{1.8} \qquad (1)$$

The pressure drop between the inlet and the settling chamber 328 also increased with inlet velocity. The pressure drop increased with increase in re-entry tube 340 size. This was because the cyclone 322 gas efflux from the solids exit slot increased as the diameter of the re-entry tube was increased.

The swirl vane 324 pressure drop was generally related to the cyclone 322 inlet velocity as:

$$\Delta P = 1e-05 Vel^{1.96} \tag{2}$$

Approximately 25% of the cyclone 322 pressure drop was taken through the swirl vanes 324.

The particle size distributions of catalyst in the clean gas at 195 ft/s (with 6 cyclones) and at 244 ft/s (with 4 cyclones) showed that there were particles in the clean gas larger than 10 $\mu$m when the cyclones were operated at a higher inlet velocity. The PSD at 244 ft/s inlet velocity displayed two cut sizes, one at approximately 6 $\mu$m and the other at approximately 50 $\mu$m. The material between 6 and 50 $\mu$m appears to come from re-entrainment of catalyst from the settling chamber 328 when the cyclone inlet velocity was increased. These cyclones did not have shields 335. The first cut diameter for the higher inlet velocity was smaller than the cut diameter at the lower cyclone inlet velocity. This showed that the cyclone efficiency increased as the inlet velocity was increased.

The re-entry tube 340 velocity was determined at constant underflow rate of 3% from helium tracer measurement. The re-entry tube 340 velocity increased when the cyclone inlet velocity was increased because more gas exited through the dust slot into the settling chamber 328. At the refinery cyclone inlet design velocity, the re-entry tube 340 velocity measured from the helium tracer was several orders of magnitude greater than had been assumed.

The performance of the TSS with finer inlet dust particle size distribution was studied by injecting fines compared with the feed blend PSD used for the rest of the tests. The fines had 66% of catalyst particles less than 10 $\mu$m, whereas the normal feed blend had only 24% of the catalyst particles less than 10 $\mu$m. The test was performed with the cyclones 322 having 3" re-entry tubes 340 and shields 335. At approximately the same inlet velocity and dust loading, the cyclone efficiency decreased by 21% with feed of finer particle size distribution. However, the size distribution of catalyst fines in the clean gas was not affected by the feed size. There were no 10+ $\mu$m particles in the clean gas even when the cyclone was fed with 66% of less than 10 $\mu$m particles. This suggested that the grade efficiency of the cyclone 322 was constant and independent of inlet particle size distribution.

The effect of the inlet dust loading on the performance of the cyclones was characterized by studying its collection efficiency at different inlet dust loading. The inlet dust loading was varied between 400 mg/Nm$^3$ and 900 mg/Nm$^3$. The cyclones 322 used had shields 335 and 3" re-entry tubes 340. The results showed that the cyclone 322 efficiency increased with inlet dust loading by about 6% when the dust loading to the cyclone 322 was doubled.

The effect of the re-entry tube 340 diameter on the cyclone performance was studied. Two re-entry tube 340 sizes of 2.02"(nominal 2") and 2.97"(nominal 3") ID were studied in addition to the 1.049"(nominal 1") re-entry tube 340 of the base design. Shields 335 were also installed on the cyclones 322. The investigation of the performance of the cyclones 322 with the three re-entry tube 340 sizes showed that there was a slight reduction in the cyclone efficiency when the re-entry tube 340 was enlarged from 1.029" to 2.97" ID. The performance of the largest re-entry tube 340 was approximately the same as that of the cyclone 322 with 1" re-entry tube 340 without shields 335; however, there were no +10 $\mu$m particles in the clean outlet gas.

Enlarging the re-entry tube 340 from 1.049" to 2.97" resulted in a decrease in the re-entry tube 340 velocity from 400 ft/s to 100 ft/s, respectively. Though the re-entry tube 340 velocity decreased, the amount of gas exiting from the dust slot also increased, which resulted in more net flow of gas entering the cyclone 322 through the re-entry tube 340 at constant underflow rate. The turbulence in the settling chamber 328 therefore increased as the re-entry tube 340 size was increased, at constant underflow rate. Nevertheless, the reduction in the re-entry gas velocity reduced the amount of catalyst re-entrainment from the settling chamber 328.

The investigation of the effect of re-entry tube 340 diameter on TSS outlet particle size distributions (PSD) showed that the cut point of outlet PSD decreased from 5 $\mu$m to 3 $\mu$m when the re-entry tube 340 was enlarged from 1.049" to 2.02" or 2.97". Enlarging the re-entry tube 340 size can improve the operability of the unit without significant loss of cyclone 322 efficiency.

A test without the inlet baffle was performed to determine if removal of the inlet baffle would result in gas and catalyst maldistribution to the cyclones 322 and affect their performance. This was in response to a suspicion that the presence of the inlet baffle might cause the upper windows to be plugged with refractory debris. The cyclones 322 used in this test had shields 335 and 3" nominal re-entry tubes 340. The results showed that the removal of the inlet baffle did not negatively impact the collection efficiency of the cyclones and there were no 10+ $\mu$m particles in the clean gas stream exiting the cyclones. The inlet pressure drop was lower without the inlet baffle.

A single test was run to study the effect of the dust exit slot size on the cyclone performance. This test was performed with cyclones 322 with 3" nominal re-entry tubes 340 and shields 335 at an underflow of 3%. The dust exit slot width was decreased from the 1.5" used in the base design to 1.0". The slot height of 2.5" was not changed. The results were compared with cyclones 322 with the standard slot width of 1.5". Decreasing the slot width at constant underflow rate resulted in an approximately 4% decrease in the cyclone 322 efficiency; but the pressure drop across the cyclones 322 was not affected. The gas flow rate out of the slot did not change, but its velocity increased by approximately 87 ft/s due to reduction in the slot area. This might have caused an increase in the turbulence in the settling chamber 328, thus leading to higher re-entrainment of catalyst. It was also plausible that when the slot width was decreased, it inhibited the outflow of dust from the cyclone 322, causing internal re-entrainment of the dust into the vortex to increase.

The results of plugging the re-entry tubes 340, run with 25% of the re-entry tubes 340 plugged (one re-entry tube 340), were compared with data from two tests that were run under similar conditions with re-entry tubes 340 unplugged. Based on the data, plugging 1 out of every 4 re-entry tubes 340 did not appear to negatively impact the effectiveness of the cyclone system. It also did not change the pressure drop across the cyclones 322.

A curved Plexiglas plate (not shown) was used to cover the upper inlet window 320 to simulate the effect of a plugged inlet window in the commercial unit. The results showed that plugging the inlet window neither affected the cyclone collection efficiency nor caused the loss of +10 $\mu$m particles in clean gas. However, it did increase the pressure drop across the inlet pipe because all the gas passed through the lower window.

Another test was conducted to investigate the effect of completely plugging the swirl vanes 324 of some cyclones 322 while leaving their dust exit slot; re-entry tubes 322 and gas outlet tubes open. The test was run with four functioning cyclones 322, while two non-functioning cyclones (322B, 322E) were left blocked with their dust exit slots, re-entry tubes 340 and gas outlet tubes left open. The results showed a significant drop in the cyclone collection efficiency resulting in a sharp increase in 10+ μm particles in the clean gas exiting the cyclones 322. Blocking or plugging the swirl vanes 324 resulted in gross gas and solids short-circuiting between the settling chamber 328 and the outlet plenum 344. This created a vacuum effect that cleaned off all the dust particles that usually stuck to the walls and flanges after the run, and there was little dust collection in the settling chamber 328. This failure mode, among the three that were studied, was the most catastrophic to the operation of the cyclone system. It resulted in the immediate deterioration in performance. Partial blockage of the swirl vanes 324 could produce the same effect, but it would be less dramatic.

The results from the cold flow modeling described above showed that the presence of large particles in the clean outlet gas of the TSS without the shields was caused by re-entrainment of already separated catalyst particles from the settling chamber. There was a strong degree of turbulence and clockwise motion of separated particulates in the settling chamber. The gas/solids exit velocity from the cyclone was found to be higher than design and, as a consequence, catalyst particles exiting were projected closely to the entrance of the gas re-entry tubes of adjacent cyclones. The velocity of the gas entering the cyclone through the re-entering tube was several orders of magnitude higher than assumed for the design and this caused secondary re-entrainment of catalyst particles from the settling chamber. Addition of shields to the bottom of the cyclones was found to eliminate cross talk and reduced secondary re-entrainment that eliminated the +10 micron particles from the clean gas.

In addition to installation of the shield, the following two additional modifications were found to improve operability of the unit: (1) enlargement of the re-entry tube from nominal 1 inch to nominal 3 inches, causing a slight decrease in the overall collection efficiency of the TSS, but reducing a tendency of the re-entry tubes to plug; and (2) removal of the inlet baffle to eliminate possible pluggage of the upper windows with refractory debris. This did not impact the cyclone performance in the cold flow unit.

EXAMPLES HYPOTHETICAL CATALYST FINES

Another example of the effect of the shields on the TSS performance is to estimate the TSS performance with a hypothetical catalyst fines composition in the inlet gas stream, based on the cold flow modeling results. Assuming uniform particle sizes of 5, 10, 20 and 60 microns, the efficiency, collection rate and particle loss to clean gas for unshielded and shielded reflux tubes based on the data from the cold flow modeling are shown in Tables 3 and 4, respectively.

TABLE 3

Performance of a TSS without shields.

| Particle Size (μm) | Feed Rate (lb/hr) | Collection Rate (lb/hr) | Efficiency (%) | Loss Rate to Clean Gas (lb/hr) |
|---|---|---|---|---|
| 5 | 30 | 24.1 | 80.3 | 5.9 |
| 10 | 20 | 17.6 | 88.2 | 2.4 |

TABLE 3-continued

Performance of a TSS without shields.

| Particle Size (μm) | Feed Rate (lb/hr) | Collection Rate (lb/hr) | Efficiency (%) | Loss Rate to Clean Gas (lb/hr) |
|---|---|---|---|---|
| 20 | 20 | 19.6 | 97.8 | 0.4 |
| 60 | 30 | 29.9 | 99.5 | 0.1 |

TABLE 4

Performance of a TSS with shielded reflux tubes.

| Particle Size (μm) | Feed Rate (lb/hr) | Collection Rate (lb/hr) | Efficiency (%) | Loss Rate to Clean Gas (lb/hr) |
|---|---|---|---|---|
| 5 | 30 | 29.5 | 98.4 | 0.5 |
| 10 | 20 | 20 | 100 | 0 |
| 20 | 20 | 20 | 100 | 0 |
| 60 | 30 | 30 | 100 | 0 |

Without the shields, some large particles are re-entrained from the collection chamber out of the cyclones. With shields installed according to the present invention, the re-entrainment is eliminated.

What is claimed is:

1. An external separator housing a plurality of cyclones in an external separator vessel useful in a fluidized catalytic cracking process wherein a hydrocarbon feed is catalytically cracked by contact with a regenerated cracking catalyst in a cracking reactor to produce lighter products and spent catalyst, spent catalyst is regenerated in a catalyst regenerator having one or more separators for recovery of catalyst and fines from flue gas, to produce regenerated catalyst that is recycled to the cracking reactor and regenerator flue gas containing catalyst fines, wherein the external separator removes at least a portion of the fines from the regenerator flue gas stream, wherein the cyclones comprise:

a cyclone body having a length, a longitudinal axis, an inlet end and an outlet end;

a flue gas inlet in fluid communication with the inlet end of the cyclone body;

a gas outlet tube in the inlet end of the cyclone body for withdrawing gas with a reduced fines content;

a longitudinal axis of the gas outlet tube aligned with the longitudinal axis of the cyclone body;

a solids outlet in the outlet end of the cyclone body for discharge of fines and a minor amount of gas into a catch chamber in a lower portion of the external separator vessel;

a gas reflux opening in the outlet end of the cyclone body for recycling a portion of the gas discharged with the solids through the solids outlet from the catch chamber back into the cyclone body;

wherein the gas reflux opening is isolated from the flue gas inlet at the inlet end of the cyclone body;

a shield extending downwardly from the outlet end of the cyclone body around the gas reflux opening;

wherein the shield inhibits solids from being entrained in the gas recycled through the gas reflux opening into the cyclone body.

2. The external separator of claim 1 wherein the cyclone body is cylindrical and the solids outlet comprises an opening in a sidewall for tangential discharge of fines and a minor amount of gas into the catch chamber.

3. The external separator of claim 1 wherein the gas reflux opening comprises a hole.

4. The external separator of claim 1 wherein the gas reflux opening comprises a cylindrical tube having a longitudinal axis aligned with the longitudinal axis of the cyclone body and passing through a seal in the outlet end of the cyclone body.

5. The external separator of claim 5 wherein the gas reflux tube tangentially discharges gas reflux into the cyclone body.

6. The external separator of claim 1 wherein the feed gas inlet tangentially discharges gas into the cyclone body.

7. The external separator of claim 1 wherein the feed gas inlet axially discharges gas into the cyclone body.

8. The external separator of claim 1 wherein the gas reflux opening is a tube extending within the cyclone body from 0 to 1 cyclone body lengths and extending outside said cyclone body into the catch chamber from 0 to 1 cyclone body lengths.

9. The external separator of claim 1 comprising swirl vanes fluidly associated with the gas reflux opening.

10. The external separator of claim 9 comprising a tangential gas reflux entry into the gas reflux tube.

11. The external separator of claim 9 comprising a tangential gas reflux exit from the gas reflux tube.

12. The external separator of claim 11 wherein tangential discharges of the gas reflux tube and the feed gas inlet both induce spin in the same direction within the cyclone body.

13. The external separator of claim 1 wherein the shield is cylindrical with an open lower end.

14. The external separator of claim 13 wherein the shield has a cross-sectional area larger than the gas reflux opening.

15. The external separator of claim 9 wherein the shield has a lower end below a lower end of any lower end of the gas reflux tube.

16. The external separator of claim 3 wherein an upper end of the shield is contiguous with the outlet end of the cyclone.

17. The external separator of claim 1 wherein the shield terminates at a lower end spaced above a dense phase of solids in the catch chamber.

18. A cyclone separator, comprising:
a closed-bottom cyclone body having a length and a longitudinal axis;
a feed gas inlet for a stream of gas and entrained solids;
wherein the feed gas inlet is positioned at an inlet end of said cyclone body;
a gas outlet tube in the inlet end for withdrawing gas with a reduced entrained solids content;
wherein the gas outlet tube has a longitudinal axis aligned with the longitudinal axis of said cyclone body;
a solids outlet in a sidewall of the cyclone body for tangential discharge of solids and a minor amount of gas from the closed-bottom cyclone into a catch chamber,
a gas reflux opening fluidly isolated from the feed gas inlet for recycling gas from the catch chamber back into the cyclone body;
a shield extending downwardly from the cyclone body around the gas reflux opening.

19. The cyclone of claim 18 wherein the gas reflux opening comprises a tube, the tube extending within the cyclone body from 0 to 1 cyclone body lengths, the tube extending outside the cyclone body into the catch chamber from 0 to 1 cyclone body lengths, and wherein the shield extends downwardly from the cyclone body to below a lower end of the gas reflux tube.

20. A cyclone separator, comprising:
an at least partially cylindrical cyclone body having a length, a diameter and a longitudinal axis;
a gas reflux tube passing through and sealingly affixed to a closed end of the cyclone body, the reflux tube having:
 (a) a diameter smaller than the diameter of the cyclone body,
 (b) a reflux inlet outside the cyclone body, and
 (c) a reflux exit inside said cyclone body;
the cylindrical cyclone body having:
 (a) the closed end as one end thereof,
 (b) a gas outlet tube sealingly affixed and passing through an opposing end of the cyclone body;
the gas outlet tube having a diameter smaller than the diameter of the cyclone body;
the gas outlet tube having a longitudinal axis axially aligned with the cyclone body;
wherein the reflux exit is in a portion of the gas reflux tube which is axially aligned with the gas outlet tube,
a tangential gas and solids inlet in fluid communication with said opposing end of said cyclone body end for receiving gas and entrained solids,
a solids outlet for discharging a concentrated solids stream with a minor portion of gas from the cyclone body;
wherein the concentrated solids stream discharge is via at least one opening in a sidewall of the cyclone body near the sealed end;
wherein the solids outlet and the gas reflux inlet are in fluid communication outside of the cyclone body;
a shield disposed between the solids outlet and the gas reflux inlet;
wherein the shield inhibits entrainment of solids from the solids outlet into the gas reflux inlet.

21. The cyclone of claim 20 wherein said reflux tube extends on either side of said cyclone body by a distance equal to 0 to 100% of the length of said cyclone body, and wherein the shield extends downwardly from the cyclone body to below a lower end of the gas reflux tube.

22. A multi-cyclone gas/solids separator comprising:
a plurality of cyclones spaced horizontally apart from adjacent cyclones,
each comprising a cyclone body having:
a feed inlet end for admitting gas and entrained solids into an annular space;
wherein the annular space is defined by a sidewall of the cyclone body and a cylindrical gas outlet tube;
wherein the gas outlet tube is axially aligned with the cyclone body;
a solids outlet at an opposing end of the cyclone body;
the solids outlet comprising a tangential outlet for solids and a minor amount of gas through a sidewall of the cyclone body;
a gas reflux opening axially aligned with the outlet tube;
wherein the plurality of cyclones share a common catch chamber for solids discharged from the solids outlet;
wherein the plurality of cyclones share a common manifold for gas and entrained solids;
a plurality of shields to inhibit discharge of solids from the tangential outlet of the adjacent cyclones into a vicinity of an inlet of the gas reflux opening;
wherein the plurality of shields are positioned in the catch chamber.

23. The separator of claim 22 wherein the gas reflux opening comprises a tube, wherein the tube has an interior portion within the cyclone body, wherein the tube has an exterior portion extending into the catch chamber, wherein the interior portion comprises imperforate sidewalls and open ends, wherein the exterior portion comprises a cylindrical tube, wherein the exterior portion is surrounded by a said shield, wherein the said shield has a diameter larger than the downwardly extending cylindrical tube, wherein the shield has a lower end terminating below a lowermost end of the exterior portion.

24. In a multi-cyclone gas/solids separator comprising a plurality of cyclones spaced horizontally apart from adjacent cyclones, each comprising a cyclone body having (i) a feed inlet end for admitting gas and entrained solids into an annular space, the annular space defined by a sidewall of the cyclone body and a cylindrical gas outlet tube axially aligned with the cyclone body; (ii) a solids outlet at an opposing end of the cyclone body, the solids outlet comprising a tangential outlet for solids and a minor amount of gas through a sidewall of the cyclone body; (iii) a gas reflux opening axially aligned with the outlet tube, wherein the plurality of cyclones share a common catch chamber for solids discharged from the solids outlet, and wherein the plurality of cyclones share a common manifold for gas and entrained solids; the improvement comprising:

a plurality of shields positioned in the catch chamber;
wherein the plurality of shields are adapted to inhibit discharge of solids from the tangential outlet of the adjacent cyclones into a vicinity of an inlet of the gas reflux opening.

25. The improvement of claim 24 wherein the shields comprise cylindrical tubes extending downwardly from the solids outlet end of the cyclone body around the gas reflux openings.

26. The improvement of claim 25 wherein the shields have a diameter greater than the gas reflux openings and an open lower end.

27. The improvement of claim 26 wherein the lower ends of the shields terminate below a lower end of the gas reflux openings and above a level of dense phase solids in the catch basin.

28. The improvement of claim 27 wherein the lower ends of the shields depending from the cyclone bodies terminate at about the same height in the catch basin.

29. The improvement of claim 28 wherein the heights of the lower ends of the gas reflux openings vary from one cyclone to adjacent cyclones.

30. The improvement of claim 26 wherein the diameter of the shields is about the same as the diameter of the cyclone bodies.

31. Apparatus for separating a gas-solids mixture, comprising:

a closed bottom cyclone;
a gas reflux opening in a lower end of the cyclone;
a shield depending from a lower end of the cyclone around the gas reflux opening.

32. The apparatus of claim 31 wherein the shield is contiguous with the cyclone to surround the gas reflux opening.

33. The apparatus of claim 32 wherein the gas reflux opening comprises a tubular passage.

34. The apparatus of claim 33 wherein the shield is a concentric tube having an inside diameter larger than an outside wall of the tubular passage, and wherein the tube terminates below a lowermost end of the tubular passage.

35. A method for separating a gas-solid mixture, comprising:

introducing the mixture to respective inlets of a plurality of adjacent closed-bottom cyclones;
discharging solids-lean gas from upper ends of the respective cyclones;
discharging solids containing entrained gas from tangential outlets at lower ends of the respective cyclones;
refluxing a portion of the entrained gas into the cyclones through reflux openings formed in lower ends of the respective cyclones;
shielding the reflux openings from the tangential outlets to inhibit cross-talk.

36. Apparatus for separating a gas-solid mixture, comprising:

means for introducing the mixture to respective inlets of a plurality of adjacent closed-bottom cyclones;
means for discharging solids-lean gas from upper ends of the respective cyclones;
means for discharging solids containing entrained gas from tangential outlets at lower ends of the respective cyclones;
means for refluxing a portion of the entrained gas into the cyclones through reflux openings formed in lower ends of the respective cyclones;
means for shielding the reflux openings from the tangential outlets to inhibit cross-talk.

* * * * *